US008666237B2

(12) United States Patent
Kim et al.

(10) Patent No.: US 8,666,237 B2
(45) Date of Patent: Mar. 4, 2014

(54) COOKER AND CONTROLLING METHOD FOR THE SAME

(75) Inventors: Wan Soo Kim, Seoul (KR); Yang Kyeong Kim, Seoul (KR); Young Jun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1104 days.

(21) Appl. No.: 12/666,653

(22) PCT Filed: Dec. 30, 2008

(86) PCT No.: PCT/KR2008/007811
§ 371 (c)(1),
(2), (4) Date: Dec. 24, 2009

(87) PCT Pub. No.: WO2009/091145
PCT Pub. Date: Jul. 23, 2009

(65) Prior Publication Data

US 2011/0008027 A1 Jan. 13, 2011

(30) Foreign Application Priority Data

Jan. 3, 2008 (KR) ........................ 10-2008-0000552
Sep. 5, 2008 (KR) ........................ 10-2008-0087605

(51) Int. Cl.
*A21B 2/00* (2006.01)

(52) U.S. Cl.
USPC ............................ 392/416; 392/407; 392/436

(58) Field of Classification Search
None
See application file for complete search history.

(56) References Cited

U.S. PATENT DOCUMENTS

| | | | | | |
|---|---|---|---|---|---|
| 3,809,859 | A * | 5/1974 | Wells | 392/435 |
| 5,097,112 | A * | 3/1992 | Kanaya et al. | 219/411 |
| 5,786,569 | A * | 7/1998 | Westerberg | 219/411 |
| 8,126,319 | B2 * | 2/2012 | De Luca | 392/416 |
| 8,278,604 | B2 * | 10/2012 | Feng et al. | 219/409 |
| 2002/0092842 | A1 * | 7/2002 | Loveless | 219/400 |
| 2005/0136785 | A1 * | 6/2005 | Konishi et al. | 445/27 |
| 2008/0037965 | A1 * | 2/2008 | De Luca | 392/416 |
| 2010/0059035 | A1 * | 3/2010 | Nam et al. | 126/21 A |
| 2011/0036826 | A1 * | 2/2011 | Feng et al. | 219/409 |

FOREIGN PATENT DOCUMENTS

| | | |
|---|---|---|
| JP | 11-270859 | 10/1999 |
| JP | 11-287460 | 10/1999 |
| JP | 2006-162181 | 6/2006 |
| KR | 10-2005-09630 | 1/2005 |
| KR | 10-0717449 | 5/2007 |

OTHER PUBLICATIONS

International Search Report dated Aug. 19, 2009.

* cited by examiner

*Primary Examiner* — Thor Campbell
(74) *Attorney, Agent, or Firm* — KED & Associates LLP

(57) ABSTRACT

A cooker and a controlling method for the same are provided. A carbon heater has a wavelength bandwidth of 1.5~2.5 μm where a radiant energy is maximum, and the carbon heater provides the radiant energy into a cavity in order to heat food disposed therein.

11 Claims, 5 Drawing Sheets

COOKER AND CONTROLLING METHOD FOR THE SAME

BACKGROUND

The present invention relates to a cooker, and more particularly to a cooker which uses a carbon heater and a controlling method for the same.

A cooker is an electric appliance which heats foods using a radiative heat source and/or a convective heat source and/or a high frequency heat source. Generally, a sheath heater is used as the radiative heat source. However, there is a disadvantage in that it takes a long time to cook foods because power of the sheath heater is low. Also, there is a problem in that the efficiency of heating is substantially reduced, since it takes a long time to cook food by using the sheath heater.

SUMMARY

Embodiments provide a cooker, which is configured to heat foods more promptly, and a controlling method for the same.

Embodiments provide a cooker, which is configured to heat foods more efficiently, and a controlling method for the same.

In one embodiment, a cooker including: a cavity in which food is accommodated; a carbon heater which has a wavelength bandwidth of 1.5 ~2.5 μm where a radiant energy is maximum into the cavity in order to heat the food; a cover that covers the carbon heater from the outside; and a cover provided between an inside of the cavity and the carbon heater that transmits the radiant energy of the carbon heater into the cavity.

In another embodiment, a cooker including: a cavity; a first heater which provides radiant energy at a predetermined wavelength bandwidth used to radiatively heat food accommodated in the cavity; a second heater which provides radiant energy at a wavelength bandwidth different from the radiant energy of the first heater, used to radiatively heat the food; and a cover provided between an inside of the cavity and the first heater for transmitting the radiant energy of the first heater into the cavity.

In further another embodiment, a controlling method of a cooker having a carbon heater and at least one heater, a wavelength bandwidth where a radiant energy is maximum of the carbon heater is different from that of the heater, wherein the carbon heater and the heater are independently operated so that an operating time of the carbon heater and of the heater at least partly overlap.

The details of one or more embodiments are set forth in the accompanying drawings and the description below. Other features will be apparent from the description and drawings, and from the claims.

DETAILED DESCRIPTION OF THE EMBODIMENTS

Hereinafter, exemplary embodiments will be described in detail with reference to the accompanying drawings. However, it is to be pointed out that the embodiments do not limit the scope of the invention, but on the contrary it has to be understood that many modifications, additions, variations or substitutions may be resorted to the invention, without altering its spirit or departing from its scope of protection, as it is defined in the appended claims.

Figure 1:
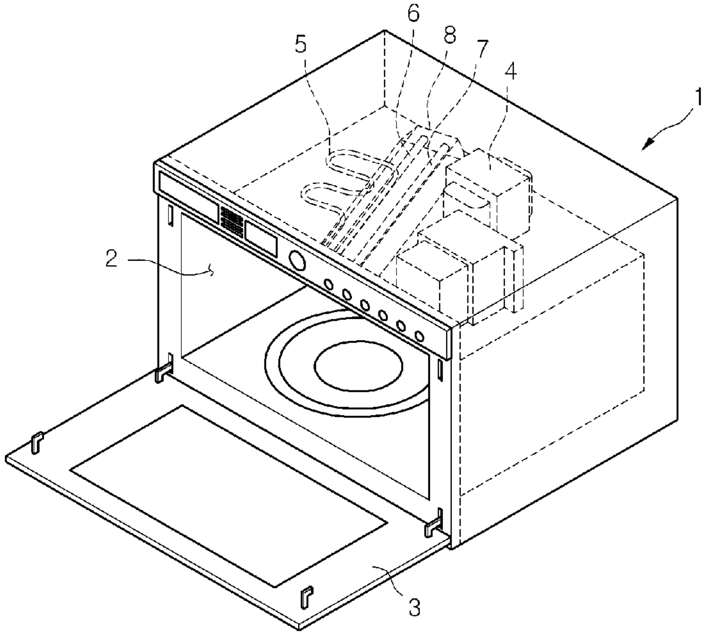
FIG. 1 is a perspective view showing a cooker according to a first embodiment.

FIG. 1 shows a cooker according to a first embodiment in a perspective view.

Referring to FIG. 1, the cooker 1 according to the first embodiment includes a cavity 2 in which foods are received, a door 3 which selectively opens the cavity 2, a magnetron 4 which radiates electromagnetic wave into the cavity 2, and a plurality of heaters which apply heat to the cavity 2.

More particularly, the heater, as a grill heater, includes a sheath heater 5, a carbon heater 6 and a halogen heater 7. And, the carbon and halogen heaters 6, 7 are protected by a heater cover 8 at the outside of the cavity 2. Here, a ceramic heater may substitute for the halogen heater 7, or it may also be used together with the halogen heater.

The sheath heater 5, carbon heater 6 and halogen heater 7, as a grill heater, heat foods inside the cavity 2 by using a radiant heating method. The heaters are different from each other in material and heating method. Hereinafter, the heaters will be explained.

First, the sheath heater is formed by compressing a metal protective tube in a state where insulating wires are wired on the metal protective tube in precise intervals and magnesia is filled therein. Therefore, the sheath heater is stable against physical impact from the outside and is able to be bent or processed to various shapes. The sheath heater has been used as a conventional main heater because it has excellent thermal efficiency, mechanical strength, a resistance to vibration and external impact, and excellent durability.

Also, the carbon heater is configured such that carbon wires composed of carbon fibers of specific crystal structure are used as a heating element and they are filled in a quartz glass element and are graphitized. Therefore, the carbon heater has an advantage in that the resistance stability, in particular the age-based resistance stability, is excellent when the carbon wires emit heat as being electrically coupled. There are advantages in that the carbon wire heating element has excellent up-and-down temperature characteristics and good high-temperature durability as well as the flexibility of solid carbon material is excellent when being made of a plurality of fiber bundles and the processing into various structures and shapes can be easily made. Therefore, the heater in which the carbon heater is inserted into a clean support element such as a quarts glass element of high purity together with non-oxidic has more excellent characteristics, since particles are not generated.

The halogen heater, which is a kind of incandescent lamp, is a lamp which suppresses any evaporation of tungsten constituting a filament by injecting halogen material into a glass sphere. In particular, the halogen lamp is made of a quartz glass pipe, which has good heat resistance, of high purity, and halogen element for preventing the degradation of luminous flux and the change of color temperature is inserted into the quartz glass pipe.

Also, the ceramic heater has a construction such that a heating element for forming resistant heat generated by current conduction is embedded into an electrically insulated ceramic having $Si_3N_4$ or AlN as a main component. Also, for example, the heating element is formed of a conductive ceramic consisting of silicates, carbonate, boride or nitride such as W, Mo, or a high melting point metal wire such as Wi, W—Re, Mo.

The respective electric heater, used as the grill heater, has a specific temperature range due to construction thereof and characteristic of the heating element. In detail, the sheath heater is adequately adapted to the temperature range of about 800° C., the ceramic heater is adequately adapted to the temperature range of about 1000° C., the halogen heater is adequately adapted to the temperature range of about 2000° C., and the carbon heater is adequately adapted to the temperature range of about 1200° C. If the working temperature of the electric heaters is above the adequate temperature, the heater, in particular the heating element is damaged and the power consumption is increased.

Hereinafter, the characteristics of the grill heater will be explained in detail with reference to the accompanying drawings.

Figure 2:
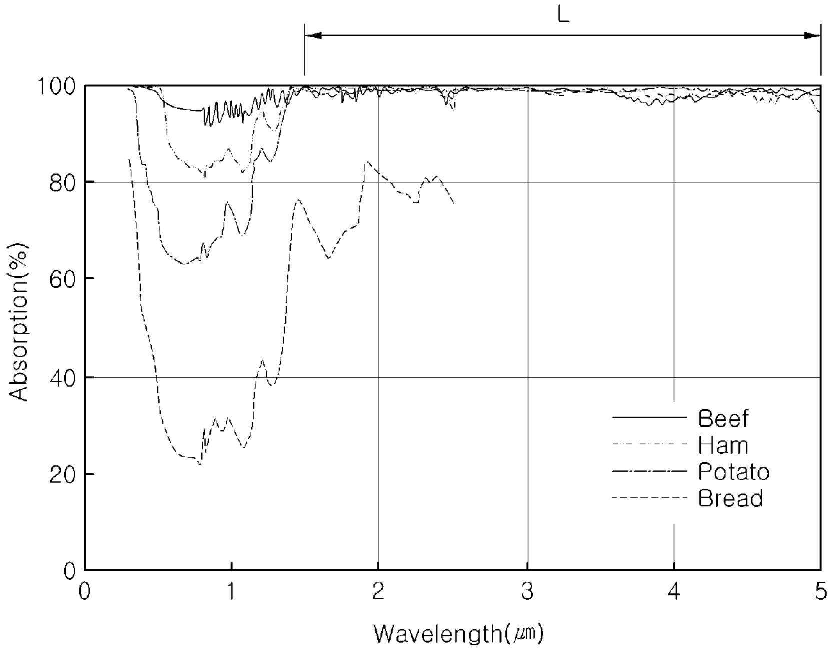
FIG. 2 is a graph showing energy absorption rates of food according to wavelength.
Figure 3:
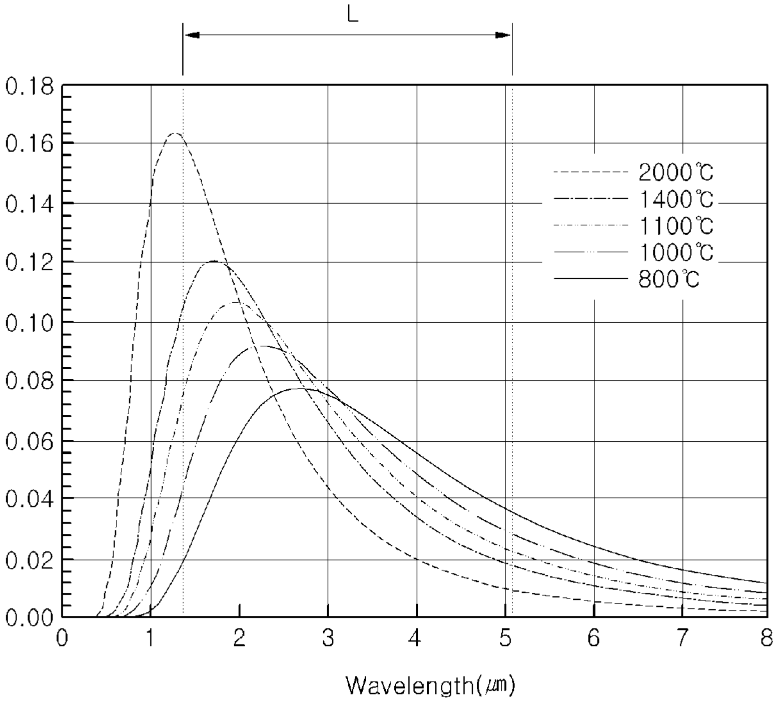
FIG. 3 is a graph showing radiant spectrums at each wavelength according to temperature.
Figure 4:
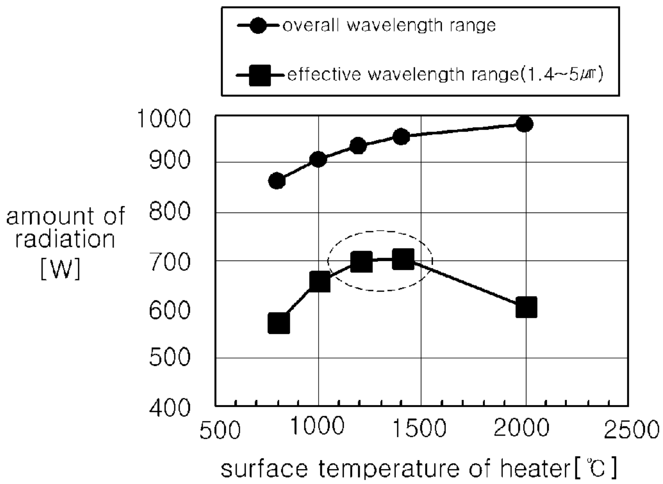
FIG. 4 is a graph showing amount of radiation according to surface temperature of a heater.
Figure 5:
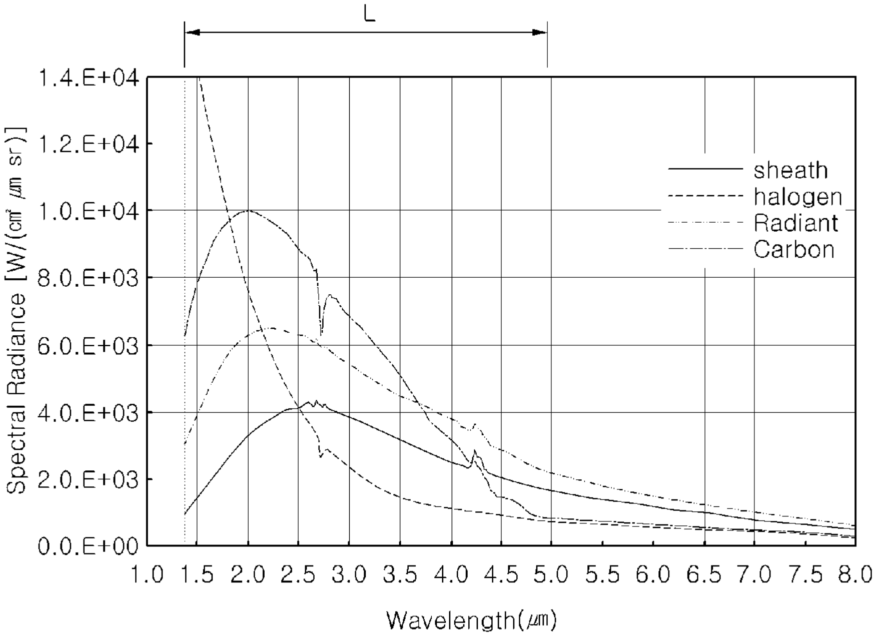
FIG. 5 is a graph showing spectral radiances according to wavelength of a carbon heater and a halogen heater.

FIG. 2 shows energy absorption rates of food according to wavelength. FIG. 3 shows radiant spectrums at each wavelength according to temperature. FIG. 4 shows the amount of radiation according to surface temperature of a heater. FIG. 5 shows spectral radiances according to wavelength of a carbon heater and a halogen heater.

Referring to FIG. 2, an experiment on main food, such as beef, ham, potatoes, and bread has shown that a wavelength of approximately 1.4~5 μm at which the energy absorption rate of the main food is good is an effective wavelength range.

Next, referring to FIGS. 3 and 4, as a heater which emits a majority of radiation of approximately 1.4~5 μm, the heater having a surface temperature of 1000~1400° C. is preferable. In detail, referring to FIG. 3, energy of the wavelength which is disposed within the temperature range of 1000~1400° C. is the most powerful, and referring to FIG. 4 which is a graph integrating FIG. 3 according to the respective wavelength, it can be seen that energy of the effective wavelength range having the temperature range of 1000~1400° C. is the most powerful.

Also, referring to FIG. 5, in the effective wavelength range (about 1.4~5 μm) of the main food, it can be seen that the amount of the radiation of the carbon heater is greater than that of the halogen heater.

On these grounds, the carbon heater is optimally used as the grill heater.

Meanwhile, Table 1 described below shows a surface temperature of the respective heater, a temperature increase of the food to be cooked, and the cost of power consumption.

TABLE 1

| surface temperature(° C.) | | | halogen 2000 | ceramic 1000 | sheath 900 | carbon 1200 |
|---|---|---|---|---|---|---|
| temperature (Δt° C.), 1200 | food (cooking time) | steak (15 min) | 31.6 | 24.2 | 23.1 | 26.7 |
| | | ham (10 min) | 27.5 | 24.9 | 23.6 | 30.4 |
| | | potato (15 min) | 37.0 | 34.8 | 29.2 | 44.0 |
| | | bread (4 min) | 8.1 | 22.8 | 5.1 | 26.3 |
| cost of power consumption (Won/1 Kw) | | | 8000 | | | 8000 |

Referring to Table 1, in the case of a carbon heater, a temperature increase of main food is higher than the other heaters. After all, this is to certify that correspondent energy is used for cooking because energy of effective wavelength range is abundant. Further, if food is cooked in a short time, the cooking time will be shortened, and therefore the heating efficiency and energy consumption efficiency of the cooker is expected to be improved.

Meanwhile, as described above, the carbon heater can be used as the most adequate grill heater, however the carbon heater has a working temperature range to some degree, so that the state of food may be differentiated as to how to set up the working temperature range.

An inventor of the invention could find that a wavelength where the radiant energy emitted from the carbon heater is maximized is 1.5~2.5 μm through a plurality of experimental tests as long as the carbon heater is adequately operated. Accordingly, it is preferable that the carbon heater is selected to be used and is operated to have a wavelength of 1.5~2.5 μm where the radiant energy is maximum, and a carbon heater 6 applied to a cooker 1 according to this embodiment is operated to have maximum radiant energy at the predetermined wavelength range.

Hereinafter, a controlling method of a cooker according to the first embodiment will be explained in detail with reference to the accompanying drawings.

The controlling method of the cooker according to this embodiment is a controlling method of the cooker, wherein food is cooked more promptly and are good to eat, and unevenly heated regions of the food are eliminated.

As described above, the cooker according to this embodiment has various kinds of grill heaters, since food can be heated in the most adequate way. For example, a heating method of the sheath heater 5, carbon heater 6 and halogen heater 7 will be explained.

Figure 6:
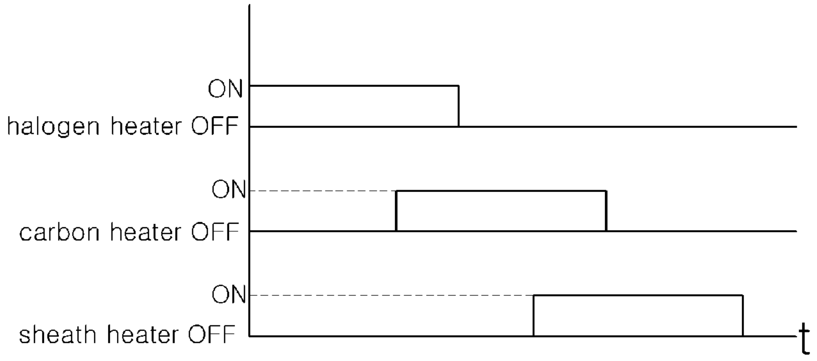
FIG. 6 is a view showing a controlling method of a cooker according to the first embodiment.

FIG. 6 shows a controlling method of a cooker according to the first embodiment.

Referring to FIG. 1, in the case a temperature of an inside of a cavity 2 is low at the early stage of cooking food, a halogen heater 7 having high working temperature is operated to warm the inside of the cavity 2 in a short period. And, after the elapse of a predetermined period, a carbon heater 6 having high heating efficiency is operated to cook food. With the carbon heater 6, as described above, the heating efficiency of food is high because the energy absorption rate of food is excellent, and therefore the food will be cooked more promptly.

And then, after the food is done to a degree by operating the carbon heater 6, the sheath heater 5 is operated to heat the surface of the food, thereby changing the color thereof, i.e. browning the food.

Meanwhile, it is also possible to operate all of the heaters at the same time; however, this may disturb an operational stability of the cooker and cause an electric accident because the heaters consume a lot of electricity, and thus this is not preferable. Merely, in order to realize the most adequate operational state, it is preferable that one heater is turned off after the other heater has been activated.

Hereinafter, a cooling method of a heater of the cooker according to the first embodiment will be explained in detail with reference to the accompanying drawings.

Figure 7:
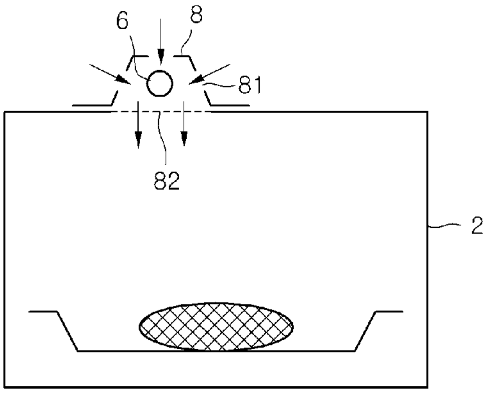
FIG. 7 is a cross-sectional view schematically showing a cooling method of a heater of the cooker according to the first embodiment.

FIG. 7 schematically shows a cooling method of a heater of the cooker according to the first embodiment.

Referring to FIG. 7, the heater cover 8 is provided as a trihedron for covering a top surface of the cavity 2, and a through-hole 81 is formed in a respective surface of the trihedron. And, a cover 82 is provided at a top surface of the cavity, where the carbon heater 6 is installed. The cover 82 has multi-holes. For example, the cover 82 may be configured of a mesh material. The cover 82 prevents the breakage of the carbon heater 6 by diminishing effects of the electromagnetic waves generated from the magnetron 4 on the carbon heater 4. According to this embodiment, the halogen heater 7 is also provided in the cover 8; however, the halogen heater 7 is not illustrated for convenience of explanation.

According to this construction, air flow formed by a fan, which is separately installed in the cavity 2, is introduced into the heater cover 8 via the through-hole 81. And, the air sucked into the heater cover 8 via the through-hole 81 is heated by the carbon heater 6 and is supplied into the cavity 2.

According to the first embodiment, the carbon heater capable of cooking food to be grilled in the most suitable way is provided, and also the other kind of grill heater is further installed to accomplish the cooking more rapidly. By means of this construction, it is possible to considerably reduce the cooking time of food and there is an advantage in that energy efficiency is increased. Also, as the controlling method of the cooker is controlled in accordance with the heating state of food, there is an advantage in that food can be cooked more rapidly and efficiently.

Further, as the structure where the carbon heater 6 is installed is optimally proposed, there are advantages in that contaminants are prevented from being attached to the carbon heater 6 by means of a convection current around the carbon heater and the durability of the carbon heater is improved by the formation of the cover 82.

In the first embodiment, there is a problem in that the thermal efficiency of the cavity is reduced as external air is introduced into the cavity. In order to resolve this problem, a second embodiment proposes a structure that external air is blocked from entering into the cavity and an inner space of the heater cover 8 is cooled by a cooling channel which is independent from the cavity. However, except for the above, this embodiment is the same as the first embodiment, and therefore detailed description of this embodiment will be omitted.

Figure 8:
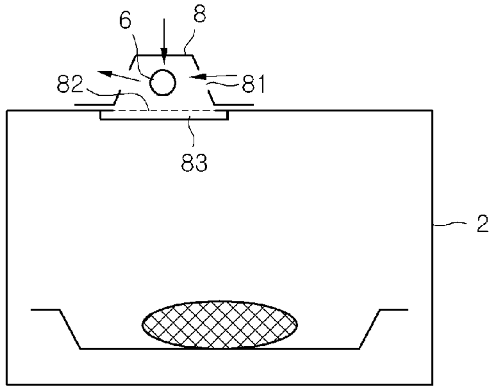
FIG. 8 is a cross-sectional view schematically showing a cooker according to a second embodiment.

FIG. 8 schematically shows a cross-sectional view of a cooker according to the second embodiment.

Referring to FIG. 8, a ceramic glass cover 83 is installed such that it is overlapped with the cover 82. That is, the ceramic glass cover 83 substantially serves to divide an inside of the cover 8, where the carbon heater 6 is installed, from an inside of the cavity 2 by closing the cover 82. And, a through-hole 81 is formed in left and right sides of the cover 8.

Therefore, external air introduced through any one of the through-holes 81 is returned to the outside after cooling off the carbon heater 6. Accordingly, there is little risk that thermal efficiency is decreased as the external air is introduced into the cavity 2. Also, there is no risk that smoke in the cavity 2 is prevented from introducing into the heater cover 8 by the ceramic glass cover 83. Therefore, the carbon heater 6 maintains its uncontaminated state for a long time.

However, in case the ceramic glass cover 83 is applied, it should be considered that radiant energy is apt to be absorbed by the ceramic glass cover 83.

Figure 9:
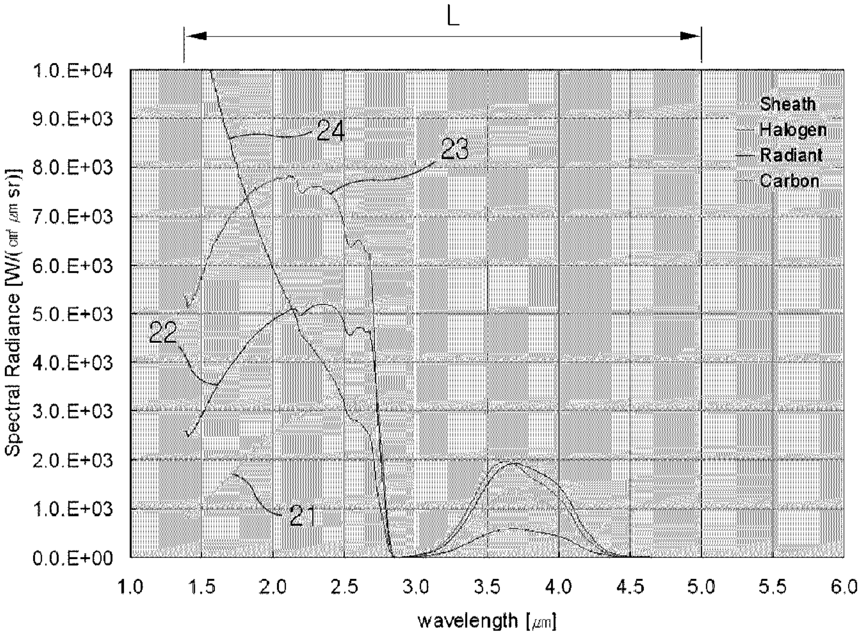
FIG. 9 is a graph showing a transparency rate of the radiant energy against a glass ceramic cover depending on the type of the heater.

The inventor of the invention measures the transparency of radiant energy against the glass ceramic cover according to the respective grill heater in order to verify this, the result is illustrated in FIG. 9.

Referring to FIG. 9, it is shown that a radiant energy transmissivity graph 21 of the sheath heater, a radiant energy transmissivity graph 22 of the ceramic heater, a radiant energy transmissivity graph 23 of the carbon heater, and a radiant energy transmissivity graph 24 of the halogen heater are different from one another. More specifically, the sheath heater and ceramic heater are not preferable because the radiant energy transmissivity of them is lower than that of the carbon heater. And, even though the transmissivity of the halogen heater is high, since the relative intensity of the radiant energy at maximum absorption range is low, the radiant energy to be absorbed from the food is relatively less than that of the carbon heater and therefore it is not preferable.

For this reason, it is understandable that the carbon heater 6 is adequately used without the reduction in thermal efficiency, even though the glass ceramic cover 83 is applied. As a comparative example, in case the halogen heater is used, the overall transmissivity is high but the energy absorbed in the object to be cooked is low, and therefore this is not preferable.

Hereinafter, a cooker according to a third embodiment will be explained in detail with reference to the accompanying drawings.

Figure 10:
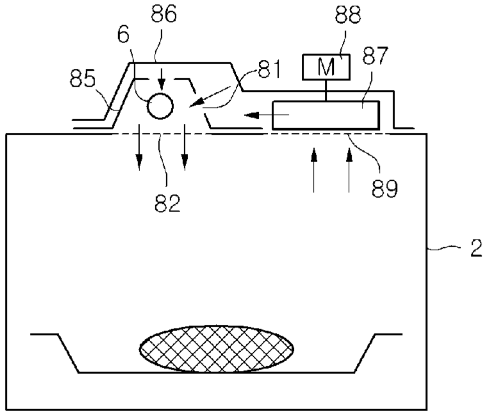
FIG. 10 is a cross-sectional view schematically showing a cooker according to a third embodiment.

FIG. 10 is a cross-sectional view schematically showing a cooker according to a third embodiment.

Referring to FIG. 10, a first cover 85 for covering the carbon heater 6 is installed at a top surface of the cavity 2. And, a second cover 86 for covering the first cover 85 is installed at the top surface of the cavity 2. Here, an external surface of the first cover 85 and an external surface of the second cover 86 are spaced apart from one another. Also, a fan 87 and a motor 88 for rotating the fan 87 are installed in a space defined between the first and second covers 85, 86. An intake hole 89 is formed at a location where an intake of the fan 87 is contacted with the cavity 2, such that air inside of the cavity 2 is introduced into the fan 87.

The operation of the third embodiment having the configuration as described above will be explained below.

In case the cooling of the carbon heater 6 is required as the cooker is operated, the fan 87 is rotated. By the rotation of the fan 87, the air inside of the cavity 2 is introduced via the intake hole 89, and the air discharged from the fan 87 is introduced into the first cover 85 after flowing through the space between the first and second covers 85, 86. And, the air introduced into the first cover 85 is discharged into the cavity 2.

According to the embodiment as described above, the air inside of the cavity 2 is circulated with the outside thereof, and therefore there is no loss in quantity of heat. Accordingly, heating efficiency is improved and energy consumption efficiency is increased. Also, even though this is not illustrated, contaminants may be preferably prevented from being attached on the carbon heater 6 by installing a filter at any point of a path, through which the air is circulated.

Hereinafter, a cooker according to a fourth embodiment will be explained in detail with reference to the accompanying drawings. However, this embodiment is almost the same as the first embodiment, and therefore the explanation of the non-described parts may be referred to the first embodiment.

Figure 11:
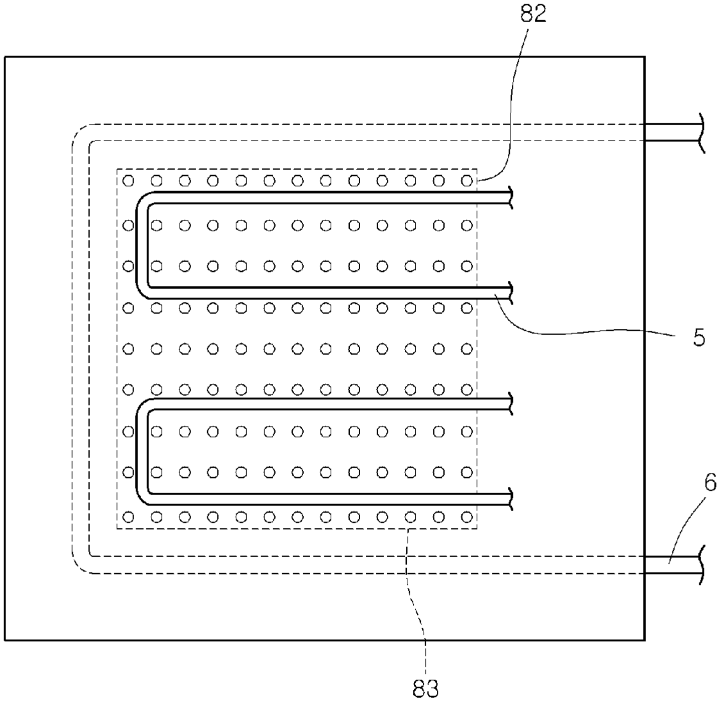
FIG. 11 is a cross-sectional view schematically showing some part of a cooker according to a fourth embodiment.

FIG. 11 schematically shows some part of a cooker according to the fourth embodiment in a plan view.

Referring to FIG. 11, in this embodiment, the sheath heater 4 is installed in the cavity 2 around the cover 82, and the carbon heater 5 is installed out of the cavity 2. For example, the sheath heater 4 and carbon heater 5 may be positioned at an inside of the cavity 2 corresponding to a lower portion of the cover 82 and at an outside of the cavity 2 corresponding to an upper portion of the cover 82. Here, projections provided in a direction where the radiant energy is directed into the cavity 2 of the sheath heater 4 and carbon heater 5, i.e. projections in a direction toward a lower portion of the sheath heater 4 and carbon heater 5 are not overlapped and spaced apart to each other. This is to prevent the thermal interference between the sheath heater 4 and carbon heater 5, in particular this is to prevent the supply of the radiant energy of the carbon heater 5 into the cavity 2 from being interfered by the sheath heater 4 or to prevent the sheath heater 4 from being damaged by the radiant energy of the carbon heater 5.

According to embodiments, the following effects are expected.

First, according to embodiments, a plurality of heaters, in particular carbon heaters, are used to cook food efficiently and rapidly.

Second, according to the embodiments, another heater having a radiant energy of a wavelength different from the carbon heater is used such that food is cooked more efficiently and rapidly.

The invention claimed is:

1. A cooker, comprising:

a wall that defines a cavity to accommodated to accommodate items to be cooked;

a carbon heater that provides radiant energy at a predetermined wavelength bandwidth used to radiatively heat items accommodated in the cavity, the carbon heater being disposed outside of the cavity;

a first cover that covers the carbon heater and disposed outside of the cavity and provided with at least one cooling hole; and a second cover that covers the first cover, the second cover being spaced apart from the first cover, such that the first and second cover define a cooling passage, wherein the wall is provided with a first surface including a plurality of holes that transmits the radiant energy of the carbon heater into the cavity, and wherein the first cover covers the plurality of holes.

2. The cooker according to claim 1, further comprising:

a fan to generate a cooling air flow covered by the second cover.

3. The cooker according to claim 1, wherein the first surface is configured of a mesh material.

4. The cooker according to claim 1, wherein the predetermined wavelength bandwidth of the carbon heater is 1.5~2.5 μm where a radiant energy is maximum into the cavity.

5. A cooker, comprising:

a wall that defines a cavity to accommodate items to be cooked and provided with a first surface including a plurality of holes;

a carbon heater that provides radiant energy at a predetermined wavelength bandwidth used to radiatively heat items accommodated in the cavity, the carbon heater being disposed outside of the cavity;

a heater cover that covers the carbon heater and disposed outside of the cavity; and a glass cover provided within the cavity that transmits the radiant energy of the carbon heater into the cavity, wherein the glass cover covers the plurality of holes.

6. The cooker according to claim 5, wherein the predetermined wavelength bandwidth of the carbon heater is 1.5~2.5 μm where a radiant energy is maximum into the cavity.

7. A cooker, comprising:

a wall configured that defines a cavity;

a first heater that provides radiant energy at a predetermined wavelength bandwidth used to radiatively heat items accommodated in the cavity and disposed outside of the cavity; and a second heater that provides radiant energy at a predetermined wavelength bandwidth different from the radiant energy of the first heater, used to radiatively heat the items and disposed within the cavity, wherein the first and second heaters are arranged such that projections of the first and second heaters in a vertical direction do not overlap and are spaced apart from each other.

8. The cooker according to claim 7, wherein the wall comprises a multi-hole cover or a mesh cover that transmits the radiant energy of the first heater into the cavity, and wherein the multi-hole cover or the mesh cover is disposed between the first heater and the second heater.

9. The cooker according to claim 7, further comprising:

a glass cover provided between an inside of the cavity and the first heater that transmits the radiant energy of the first heater into the cavity.

10. The cooker according to claim 7, wherein the predetermined wavelength bandwidth of the first heater is 1.5~2.5 μm where a radiant energy used to radiatively heat the items is maximum, and the predetermined wavelength bandwidth of the second heater is above or below the predetermined wavelength bandwidth of the first heater.

11. The cooker according to claim 7, wherein the first heater is a carbon heater, and the second heater is at least one of a sheath heater, a ceramic heater, or a halogen heater.

* * * * *